United States Patent [19]

Johannesson

[11] Patent Number: 4,730,962

[45] Date of Patent: Mar. 15, 1988

[54] DIVIDED MILLING CUTTERS

[76] Inventor: Lennart Johannesson, Parkgatan 41, NÄSSJÖ , Sweden, S-571 00

[21] Appl. No.: 771,058

[22] Filed: Aug. 30, 1985

Related U.S. Application Data

[63] Continuation-in-part of Ser. No. 455,825, Jan. 5, 1983, Pat. No. 4,552,496.

[30] Foreign Application Priority Data

Jan. 7, 1982 [SE] Sweden ................................ 8200034

[51] Int. Cl.[4] .......................... B23C 5/08; B27G 13/08

[52] U.S. Cl. ................................. 409/209; 144/90 A; 407/31; 409/234; 409/236

[58] Field of Search ............... 409/234, 218, 209, 236; 144/90 A, 134 R; 279/2 A; 408/116; 407/31

[56] References Cited

U.S. PATENT DOCUMENTS

| | | | |
|---|---|---|---|
| 987,391 | 3/1911 | Mitchell | 144/90 A |
| 1,039,055 | 9/1912 | Helwig | 409/218 X |
| 2,303,651 | 12/1942 | Mason | 408/116 |
| 3,946,777 | 3/1976 | Heimbrand | 144/90 A |
| 4,244,248 | 1/1981 | Adell et al. | 409/234 X |
| 4,421,443 | 12/1983 | Woythal et al. | 409/234 X |
| 4,467,977 | 8/1984 | Gahrugeri | 279/2 A X |
| 4,504,179 | 3/1985 | Nicolin | 279/2 A X |
| 4,533,287 | 8/1985 | Hagemeyer et al. | 409/234 |
| 4,547,997 | 10/1985 | Kimmelaar et al. | 409/234 X |

FOREIGN PATENT DOCUMENTS

| | | | |
|---|---|---|---|
| 2436810 | 2/1976 | Fed. Rep. of Germany | 409/234 |
| 19595 | 2/1905 | Sweden | 144/90 A |

*Primary Examiner*—Z. R. Bilinsky

*Attorney, Agent, or Firm*—Cushman, Darby & Cushman

[57] ABSTRACT

A divided milling cutter comprises a first cutter half and a second cutter half which are adjustable in relation to each other with respect to their mutual distance and are both connected to a first, common, hydraulic sleeve which has an internal, annular pressure chamber and is threadable on to and securable to a cutter spindle or the like. To make possible a continous or step-less variation of the distance between the cutter halves in a simple way even when they are mounted on the cutter spindle said second cutter half is fastened to a second sleeve which is in threaded engagement with a third, threaded sleeve having a substantially annular flange which abuts an end of, or shoulder on, the first sleeve. In working position the sleeves and the cutter halves are retained on the cutter spindle by pressurizing the hydraulic sleeve for pressing the inner wall of its pressure chamber against the cutter spindle and the outer wall of said chamber against said second sleeve and the inner circumference of said cutter halves.

6 Claims, 6 Drawing Figures

DIVIDED MILLING CUTTERS

CROSS-REFERENCE TO RELATED APPLICATIONS

This application is a continuation-in part of my prior U.S. patent application Ser. No. 455,825, filed Jan. 5, 1983, now U.S. Pat. No. 4,552,496.

BACKGROUND OF THE INVENTION

This invention relates to such two-part tools, particularly milling cutters.

Divided milling cutters of the type to which this invention relates are utilized particularly in the wood working industry, e.g. for tonguing or grooving or alternatively simultaneous round-planing or bevelling of two opposing edges of boards and the like.

When boards of another thickness than previously are to be planed, one will have to change the distance between the first (upper) milling cutter half and the second (lower) milling cutter half. A traditional way of carrying out this operation (so called "setting") involves inserting or removing of a greater or smaller number of spacing washers, each having a greater or smaller thickness, between the two cutter halves. This setting operation is tedious and time consuming, since a plurality of bolts have to be unscrewed and tightened again, and it can not be carried out without previous removal of the milling cutter head from the cutter spindle. Another drawback resides therein that the distance adjustment can not be made step-less or continous.

Such divided milling cutters and similar two-part tools may be removably secured to a rotating spindle either by purely mechanical means or hydraulically. Examples of milling cutters of the first kind are disclosed in the Swedish Pat. No. 19595, the U.S. Pat. No. 987,391 to Mitchell and in my abovementioned U.S. patent application. An apparatus in which tools, such as cutter halves, may be hydraulically clamped to a rotational spindle froms the subject matter of the U.S. Pat. No. 4,244,248 to Adell et al. This apparatus comprises a double walled sleeve which is formed with means for providing a pressure in a recess formed between the outer wall and the inner wall of the sleeve and for releasing the pressure from said recess. One or more cutter halves or similar having center bores fitting the outer dimension of the sleeve are slipped onto the sleeve, whereupon the sleeve together with the tools are slipped onto a rotatable spindle, and a pressure medium inside the recess of the sleeve is pressurized, whereby the two walls of the sleeve are subjected to a radially inwards and outwards directed pressure providing some expansion outwards and inwards respectively of the said walls, whereby the sleeve, the rotatable spindle and the tools are interconnected. The tools are clamped between abutment means on axially opposite sides of the tools, spacers in the shape of distance sleeves being interposed between the tools and also between each tool and its adjacent abutment means. When the mutual distance between the tools has to be changed it is necessary to dismount the whole apparatus and substitute other distance sleeves for the previous ones. This substitution can not be carried out without removing the entire apparatus from the spindle.

SUMMARY OF THE INVENTION

In view of the above circumstances the principal object of the invention resides in providing a divided milling cutter or similar tool with setting means which permits continous adjustment of the distance between the tool halves while they remain on the spindle, and which in addition hereto is easy to manipulate and to keep clean.

This object is attained thanks to the fact that the two-part tool is so designed as is set forth in the specification.

Further features and advantages of the tool according to the invention will become apparent from the following detailed description and the annexed drawings which diagrammatically and as non-limiting examples illustrate two preferred embodiments of the invention.

DESCRIPTION OF THE PREFERRED EMBODIMENTS

Figure 1:
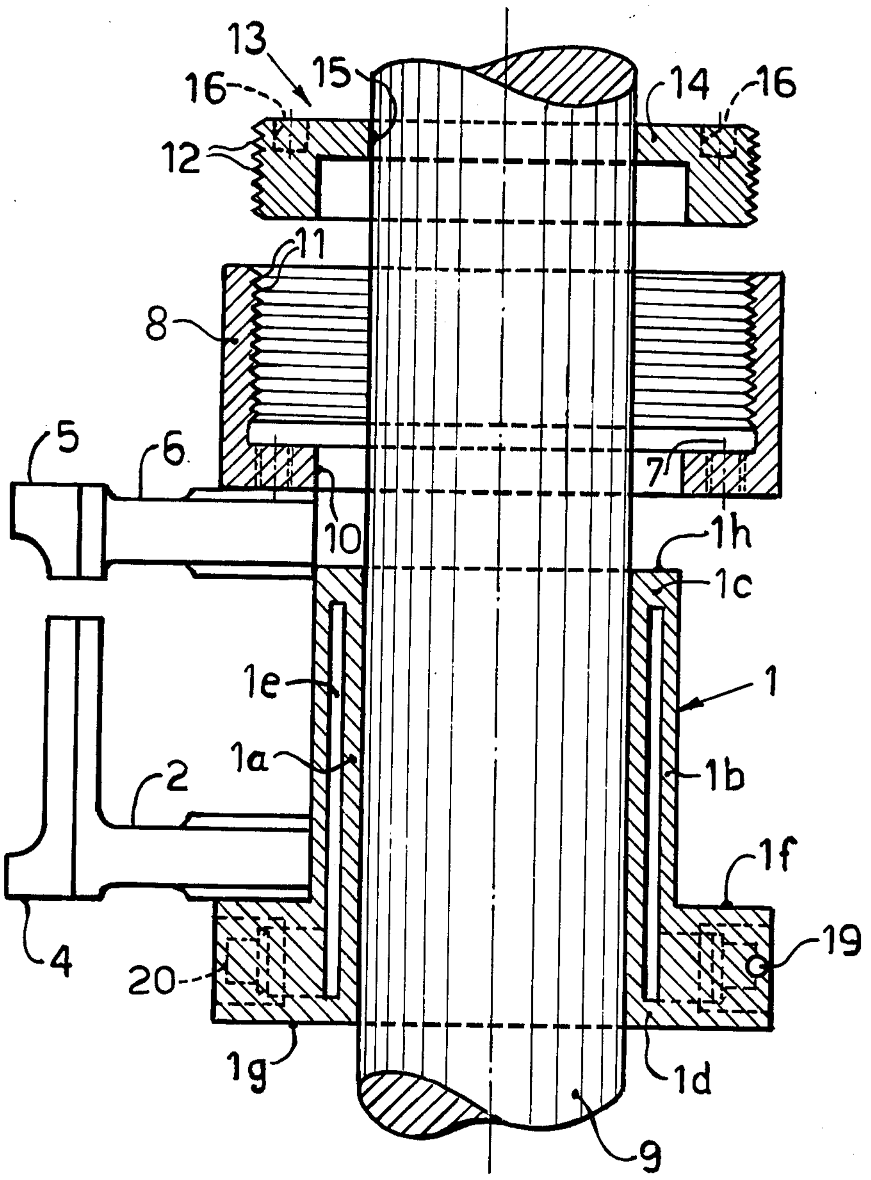
FIG. 1 is a partial, simplified, exploded, longitudinal sectional view of a first embodiment of the invention in which hydraulic locking of the cutter halves is utilized.
Figure 2:
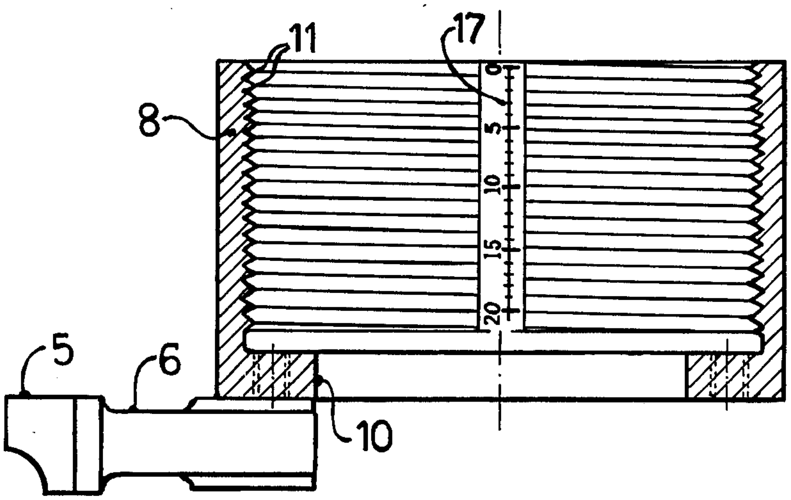
FIG. 2 is a more detailed view of one of the sleeves comprised in the two-part tool or divided milling cutter according to the invention.
Figure 6:
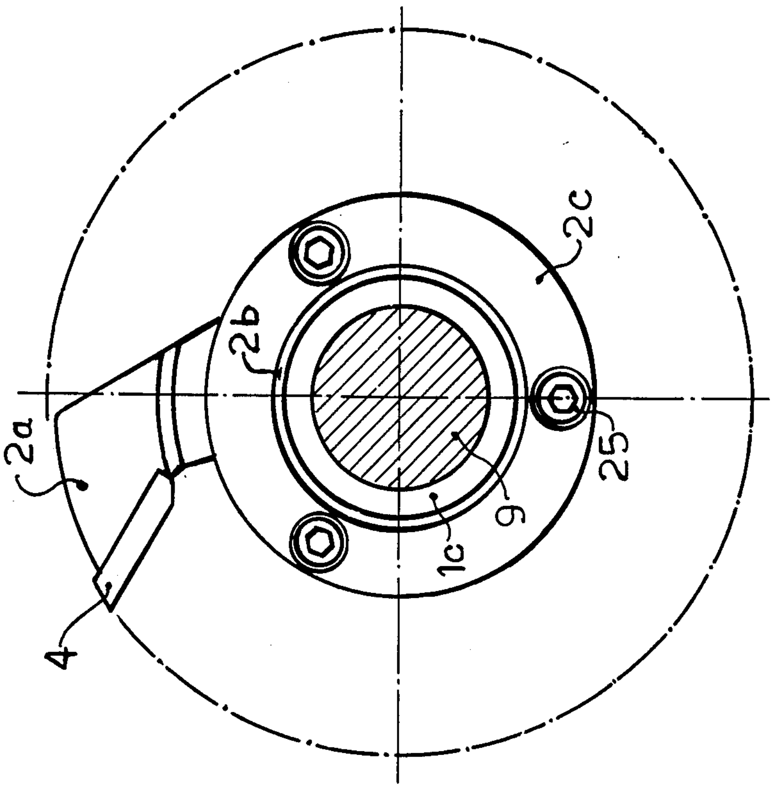
FIG. 6 is an end view of the divided milling cutter according to FIGS. 3–4 as seen from the right in FIG. 4.
Figure 3:
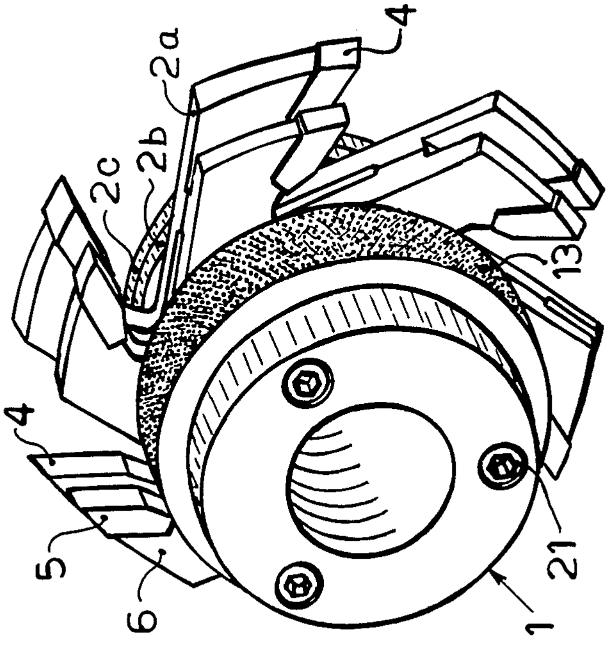
FIG. 3 is a perspective view of a divided milling cutter according to a second embodiment of the invention.
Figure 5:
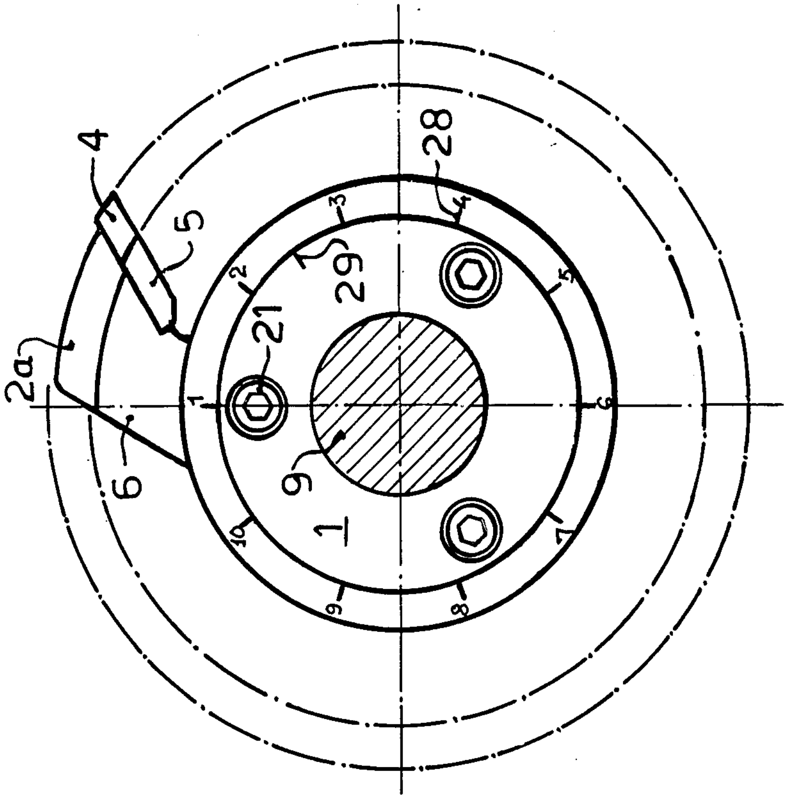
FIG. 5 is an end view of the divided milling cutter according to FIGS. 3–4 as seen from the left in FIG. 4.
Figure 4:
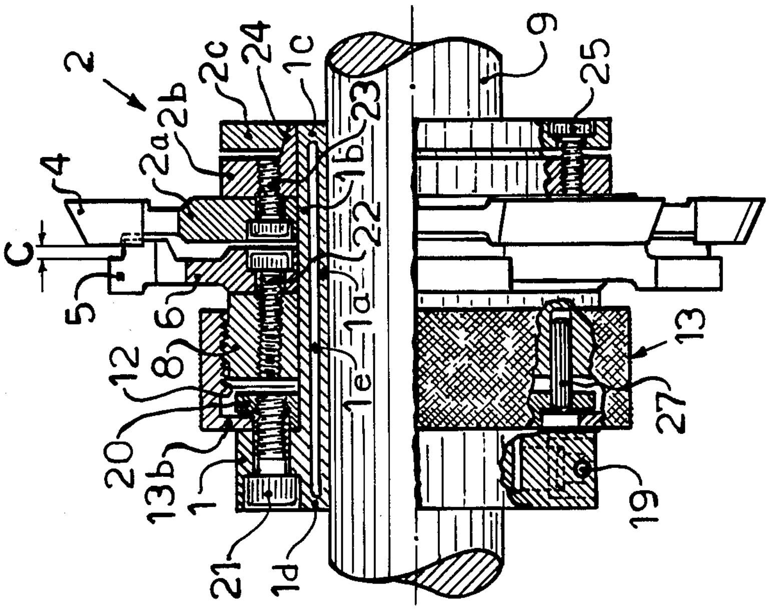
FIG. 4 is a side view, partly in section, of the embodiment according to FIG. 3.

The apparatus shown in FIGS. 1 and 2 of the drawings comprises a first, inner sleeve 1 which is intended to be secured to a milling cutter spindle 9 and is to be rotated together with the spindle. The inner sleeve 1 is a hydraulic sleeve which is double or slotted and comprises two hardened steel sleeve portions 1*a*, 1*b* which are united with each other at their ends as shown at 1*c* and 1*d*. The sleeve portions 1*a*, 1*b* are separated by an annular slot or chamber 1*e* which is filled with oil, grease, or the like which acts as a pressure medium. Chamber 1*e* is provided with an inlet 19 and an outlet 20 for the pressure medium. On the main, cylindrical portion of the sleeve 1 there is mounted a first, exchangeable milling cutter half 2 which is shown only in part and is shown as abutting the upper (in FIG. 1), annular surface 1*f* of the flange portion 1*g* of the sleeve 1. The cutter half 2 is slipped on to the inner sleeve 1 which it surrounds with a small clearance, e.g. a slight slip fit.

The cutter half 2 carries a first set of cutting edges 4 of which only one is shown. The cutting edges 4 of the first cutting half 2 cooperate with a second set of cutting edges 5 of which only one is shown. The cutting edges 5 are carried by a second milling cutter half 6 which is exchangeably secured to an outer sleeve 8 by means of screws 7 (merely indicated). To make the drawing clearer the outer sleeve 8 is not shown in its operative position but displaced axially upwards, above the sleeve 1. In the illustrated embodiment the sets of cutting edges 4,5, which are angularly staggered or displaced with respect to each other, are intended for the rounding or bevelling of two opposite, longitudinal edges of a board or deal which may be about 25 mm in thickness.

This means that the cutting-edges 4,5 are located considerably closer to each other than shown in FIG. 1.

The lower end of the sleeve 8 in FIG. 1 has an annular flange which is directed radially inwards and encircles an opening 10 which is coaxial with the sleeve 1 and has an insignificantly larger diameter than the tubular principal portion of the sleeve 1 which penetrates into the sleeve 8 through this opening.

On its entire inside the sleeve 8 is provided with an internal thread 11 which has a predetermined lead, e.g. 1 mm. Cooperating with this thread 11 is an external thread 12 on a third, intermediate sleeve which is generally designated 13. The main, tubular portion of the intermediate sleeve 13 has an inner diameter which is insignificantly greater than the outer diameter of the tubular portion of sleeve 1, so that the sleeve 13 may be slipped or threaded on thereto. Sleeve 13 also has an annular flange 14 which is directed radially inwards and defines an opening 15 having a diameter which substantially equals the inner diameter of the inner sleeve 1. In its operative working position sleeve 13 rests upon the end of the sleeve 1 by means of its annular flange 14. This annular end surface **1*h*** constitutes a reference surface.

It is obvious that the outer sleeve 8 and accordingly also the second cutter half 6 and its set of cutting edges 5 are displaced axially when the intermediate sleeve 13 is rotated manually or by means of a suitable tool cooperating with a pair of diagrammatically indicated recesses 16 in the upper end surface of the sleeve 13. An axially extending groove only shown in FIG. 2, in which a scale or graduation 17 is provided, is milled or manufactured in another way in the internal thread of the outer sleeve 8. This scale indicates the displacement of the sleeve 8 from a predetermined reference or initial position, e.g. when the upper end surface of the sleeve 8 is located in the same plane as the upper end surface of the intermediate sleeve 13, said plane being perpendicular to the common centre axis of the spindle 9 and the sleeves. This upper surface of the sleeve 13 may be provided with an arrow or another designation which cooperates with a scale of fractions of a revolution on the upper surface of the sleeve 8. With a lead e.g. of 1 mm according to the above, a rotation of 3¼ revolutions of the intermediate sleeve 13 corresponds to an axial displacement of 3.25 mm of the outer sleeve 8 in relation to the inner sleeve 1.

When mounting the tool on the spindle 9 the inner sleeve 1, the first cutter half 2 with the first set of cutting edges 4, the outer sleeve 8 with the appurtenant second cutter half 6 and the second set of cutting edges 5, and the intermediate sleeve 13 are pushed or slipped on to the spindle 9. Then, the desired spacing between the cutter halves 2, 6 is set by rotating the intermediate sleeve 13 the proper number of turns and fractions of turns as described above, which is a very simple operation thanks to the present invention. Finally the parts of the tool are clamped or locked to the spindle 9 and centered with respect thereto in their respective, desired position. Such locking is carried out by pressurizing the annular chamber **1*e* by pressing oil, grease or the like into said chamber through the inlet 19. Hereby the sleeve 1 expands radially, the inner wall 1*a* being pressed against the spindle 9 and the outer wall being pressed against the sleeves 8 and 13, and the cutter halves 2 and 6**.

As is apparent from the above, it is also very easy to change the distance between the two sets of cutting edges 4 and 5, respectively, in the apparatus according to the invention, when this is required. Such change or adjustment setting may be carried out even without removal of the divided cutter from its cutting spindle 9, simply by depressurizing the annular chamber **1*e* by means of the outlet 20 and subsequent rotational displacement of the sleeve 13 and consequent axial displacement of the sleeve 8**.

A second embodiment of the invention is illustrated in FIGS. 3–6, in which the same reference numerals as in FIGS. 1–2 have been utilized to designate same or similar parts.

In this second embodiment the hydraulic sleeve 1 is supplemented with a ring or collar 20 which closely surrounds the cylindrical, main portion of the hydraulic sleeve 1 and is secured to the flange portion of sleeve 1 by means of bolts 21 while leaving a gap or interspace therebetween. In this gap the inturned annular flange **13*b* of the second sleeve 13 is engaged. This sleeve is an outer sleeve in this embodiment and is accordingly provided with internal threads 12. These threads are in engagement with outer threads on the third sleeve 8 which constitutes the intermediate sleeve in this embodiment. The intermediate sleeve 8 is on one hand non-rotatably connected to the collar 20 by means of locking pins 27 and on the other hand rotatable with respect to the outer sleeve 13. The second cutter half 6 is bolted to the intermediate sleeve 8 by means of bolts 22. The rotational or angular position of the outer sleeve 13 with respect to the inner sleeve 1 as well as the intermediate sleeve 8 and the second cutter half 6 is indicated by a scale 28 (FIG. 5) on the flange 13*b* and an index 29 cooperating therewith on the flange portion of the inner sleeve 1**.

The first cutter half 2 is comprised of three individual parts **2*a*, 2*b* and 2*c* in this embodiment. These parts have the same internal diameter and surround the cylindrical portion of the hydraulic sleeve 1 with a minute clearance, e.g. a slight slip fit. The first part 2*a*, to which the set of cutting edges 4 are secured, is bolted to the second, intermediate part 2*b* by means of threaded bolts or screws 23. On the other hand the intermediate part 2*b* is secured to the third, outer part 2*c* by means of threaded bolts 25 and cooperates with this outer part by means of a common, frusto-conical inter-engagement surface 24. Thanks to their conical surfaces 24 the intermediate part 2*b* and the outer part 2*c* act as a locking device for the cutter half 2 even though the chamber 1*e* of the hydraulic inner sleeve 1** is not pressurized.

The embodiments described above and illustrated in the drawings are, of course, to be regarded merely as nonlimiting examples and may as to their details be modified in several ways within the scope of the following claims. In particular, the invention may be applied not only to milling cutters but also to any other two-part tool.

What I claim is:

1. A two-part tool comprising a tool spindle, an inner sleeve slidable onto an securable to said tool spindle, said inner sleeve being comprised of a hydraulic sleeve comprising an inner wall, an outer wall, a substantially annular chamber defined by said walls and containing a pressure medium, an inlet to said chamber, and an outlet form said chamber a ring-shaped member surrounding and releasably secured to said hydraulic sleeve and forming together therewith an annular groove on the external surface of said inner sleeve, a first tool half releasably secured to said inner sleeve, a second tool half releasably secured to said inner sleeve, and means for positioning said second tool half on said inner sleeve in a position which is adjustable in the axial direction with respect to said first tool half, said positioning means comprising said annular groove in the external surface of said inner sleeve, a second sleeve surrounding at least part of said inner sleeve and having internal threads and a radially inwardly directed annular flange for engaging said annular groove, a third sleeve which at least partially is in sliding engagement with said inner sleeve and is provided with external threads for cooperation with said threads of said second sleeve, said second tool half being fastened to the end of said third sleeve which is adjacent to said first tool half, said inner outer walls of the inner sleeve being deflectable radially inwardly against said spindle and outwardly against said third sleeve and said tool halves, respectively, when said second and third sleeves are in threaded engagement with each other and said annular chamber is pressurized for centering and locking of said sleeves and tool halves to the tool spindle, said tool further comprising a first ring which is in said first tool half and is in sliding engagement with said inner sleeve, said first ring having an external frusto-conical portion surrounding said inner sleeve with a minute clearance therebetween, a second ring located adjacent to said first ring on the opposite side thereof with respect to said second tool half, said second ring having an internal frusto-conical surface associated with and cooperating with the external frusto-conical surface of said first ring, and means for pressing said second ring towards said first ring in the axial direction of the rings to thereby clamp the first ring and said first tool half against said inner sleeve through a wedging action between said frusto-conical surfaces.

2. A two-part tool as claimed in claim 1 wherein one of said outer and intermediate sleeves has a circumferentially extending scale and on the other one of said sleeves an index is provided associated with and cooperating with said scale for determining the rotational position of said outer sleeve in relation to said intermediate sleeve.

3. A two-part tool according to claim 1, wherein said first tool half is releasably secured to said first ring.

4. A two-part tool according to claim 1, wherein said means for pressing said second ring against said first ring comprise threaded bores in the first ring, corresponding un-threaded bores in the second ring and screws or bolts passing through said bores of the second ring and being in engagement with the threaded bores of the first ring.

5. A two-part tool comprising a tool spindle; an inner sleeve slidable on to and securable to said tool spindle, said inner sleeve being a hydraulic sleeve comprising an inner wall, an outer wall, a substantially annular chamber defined by said walls and containing a pressrue medium, an inlet to said chamber, and an outlet from said chamber; a first tool half releasably secured to said inner sleeve; a second tool half; and means for positioning said second tool half on said inner sleeve in a position which is adjustable in the axial direction with respect to said first tool half; wherein said positioning means comprises an annular abutment surface on said inner sleeve constituting the end surface thereof; an outer sleeve provided with internal threads and having a radially inwards directed flange which at least partially is in sliding engagement with said inner sleeve and to which said second tool half is releasably secured; an intermediate sleeve partially surrounding said inner sleeve and having a radially inwards directed flange for engaging said abutment surface of said inner sleeve, and external threads for cooperation with the internal threads of said outer sleeve, said second tool half being fastened to said radially inwards directed flange on that end of said outer sleeve which is adjacent to said first tool half, said inner and outer walls of the inner sleeve being deflectable radially inwards against said spindle and outwards against said flange of said outer sleeve and said tool halves, respectively, when said intermediate and outer sleeves are in threaded engagement with each other and said annular chamber is pressurized for centering and locking of said sleeves and tool halves to the tool spindle, said internal threads of said outer sleeve having an axially extending scale for indicating the axial position of said outer sleeve in relation to said intermediate sleeve.

6. A two-part tool according to claim 5, wherein said tool is a divided milling cutter.

* * * * *